Dec. 22, 1964   M. W. LOVELAND   3,162,224
PEACH GRIPPER FOR PEACH PITTING HEAD

Filed July 3, 1963   3 Sheets-Sheet 1

INVENTOR:
MALCOLM W. LOVELAND
BY Eckhoff + Slick
ATTORNEYS

Dec. 22, 1964  M. W. LOVELAND  3,162,224
PEACH GRIPPER FOR PEACH PITTING HEAD
Filed July 3, 1963  3 Sheets-Sheet 2

INVENTOR:
MALCOLM W. LOVELAND
BY Eckhoff + Slick
ATTORNEYS

Dec. 22, 1964  M. W. LOVELAND  3,162,224
PEACH GRIPPER FOR PEACH PITTING HEAD
Filed July 3, 1963  3 Sheets-Sheet 3

INVENTOR.
MALCOLM W. LOVELAND
BY Eckhoff + Slick
ATTORNEYS 3,162,224
PEACH GRIPPER FOR PEACH PITTING HEAD
Malcolm W. Loveland, Orinda, Calif., assignor to Atlas Pacific Engineering Company, a corporation of California
Filed July 3, 1963, Ser. No. 292,626
9 Claims. (Cl. 146—28)

This invention relates to a torque peach splitter and pitter of the type disclosed in U.S. Patent 2,952,286 and more particularly to such a structure which is capable of splitting and pitting peaches with off-center pits.

The machine disclosed in the aforementioned U.S. patent has a pair of jaws which grip either half of a peach adhering to the pit while the pit itself is held by other jaws and thereafter turn the peach halves relative to the pit to effect separation. The aforementioned structure is capable of handling peaches with reasonably well centered pits. But as a fair proportion of the fruit which is encountered has the pits well displaced from center, such machines have not always performed entirely satisfactorily. That is, machines which have been available heretofore operate in such a fashion that the pit determines the position of the fruit between the jaws which twist on the peach flesh. Hence, a greatly off-center pit causes the fruit to be off-center with respect to the flesh-twisting jaws and the fruit may be damaged by these jaws.

It is therefore an object of this invention to provide an apparatus for splitting and pitting peaches, especially of the clingstone variety.

It is a further object of this invention to provide an apparatus of the type aforementioned especially adapted for handling, without damage to the flesh, peaches having pits which are greatly off-center.

Other objects and advantages of this invention, if not specifically set forth, will become apparent during the course of the description which follows.

Generally, this invention comprises a peach splitter and pitter of the torque type wherein peach halves are gripped adjacent the medial plane thereof by cinch bands while jaws grip the pit, the bands being resiliently anchored so that they are capable of yielding in the direction of a force exerted on them by the flesh of a peach, thus to avoid damage to peaches with off-centered pits.

The structure of this invention is similar to that of the aforementioned Harrer et al. Patent 2,952,286 and includes a frame, a guillotine assembly for cutting a peach about its suture and gripping its pit in the plane of the suture, a reciprocating feed assembly for periodically delivering peaches to the guillotine assembly, and a peach half gripping and twisting assembly mounted on each side of the frame for movement to and from the guillotine. Each gripping assembly includes a relatively rotatable, coaxial cup and anchoring means, at least a pair of peach-half cinch bands supported at one end by the cup and at the other end by anchoring means, means for rotating the cup so as to tension the bands into frictional engagement with a peach half, and means for resistively holding the anchoring means against rotation relative to its associated cup.

To the extent to which the elements and functions of the machine of this invention do not depart from the Harrer et al. machine, details will be omitted here.

Figure 1:
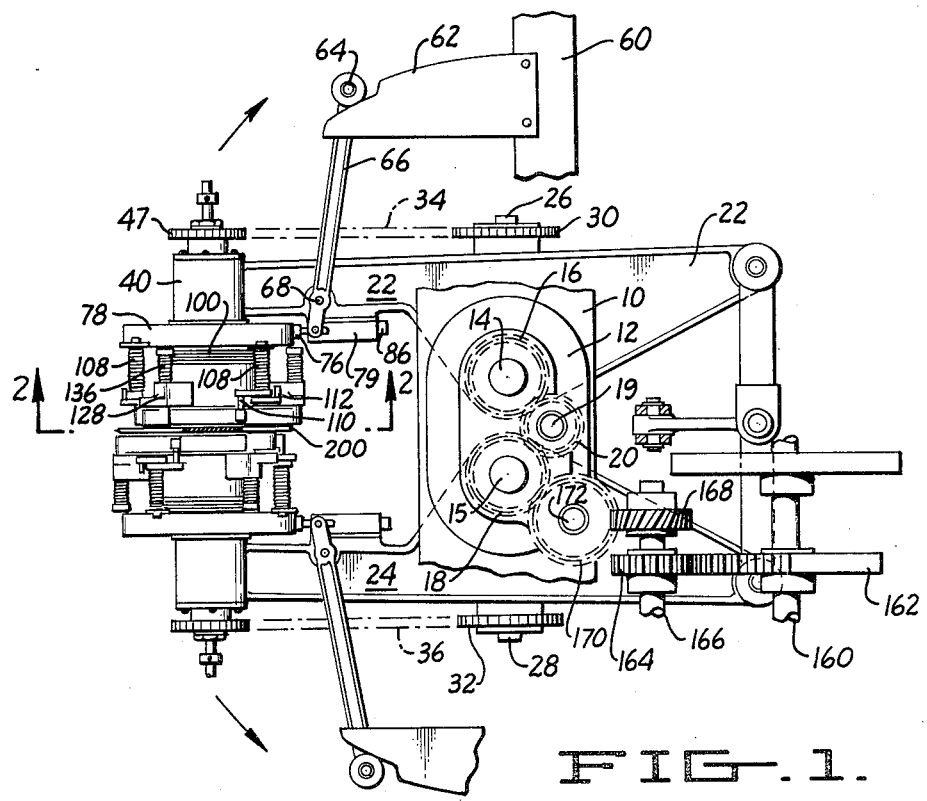
FIGURE 1 is a fragmentary plan view similar to FIGURE 2 of Patent 2,952,286 showing a peach splitter and pitter embodying the novel construction of this invention.

Referring now to the drawings wherein like characters refer to like parts throughout, secured to the frame intermediate its forward and rear ends is a transversely extending supporting member 10 having therein a bearing housing or block 12 (FIGURE 1). Formed in the block 12 is a pair of vertical bores as shown in the aforementioned Harrer et al. patent and mounted therein are suitable bearing sleeves in which are journalled parallel vertical shafts 14 and 15 which in turn support helical gears 16 and 18. Also journalled in the bearing block 12 is a shaft 19 and secured thereto in mesh with the gears 16 and 18 is a gear 20 for driving the gears 16 and 18 but in the same direction.

The arms 22 and 24 are secured at the lower ends of the shafts 14 and 15 respectively in the fashion of the arms 64 and 65 of the aforementioned Harrer et al. patent. Shafts 26 and 28 are horizontally disposed beneath the arms 22 and 24 in the fashion of the shafts 71 and 72 of the Harrer et al. patent and to the shafts are keyed sprocket wheels 30 and 32 about which are trained sprocket chains 34 and 36.

Since the peach gripping and rotating mechanism associated with the forward ends of the arms 22 and 24 are identical with the exception that one can be considered as right hand and the other as left hand, only the structure associated with the arm 22 will be specifically described.

At the forwardmost end of the arm 22 is bearing housing 40 in which are mounted the bearings 42 (FIGURE 5) which are spaced by sleeve 43. The bearings are held in place by retaining ring and screw assembly 44. The shaft 46 having sprocket 47 keyed thereto is journalled in the bearing and threaded at its lowermost end to receive nut 50 which forces washer 52 tightly into engagement with the inner shoulder of the fruit encompassing cup 54 which is keyed to shaft 46 at 55. Mounted about the hub of the cup 54 is the bushing 56 which is held in place by the flange 48 of the shaft 46 and journalled about the bushing is the brake drum 58 which serves as an anchoring means for the cinch bands aforementioned.

Integral with the frame is the cam support 60 having thereon cam 62 against which rides cam roller 64 on arm 66. The arm 66 is pivoted to arm 22 at point 68. Carried by the arm 66 is the pin 70 (FIGURE 2) which is fitted into a slot in block 72, in turn supporting pin 74 upon which the brake shoe 76 is mounted. Lining 77 bears against the stainless steel wear-ring 78 of the drum 58. Compression spring 80 bears on the block 72 and at its other end on the shoulder 82 of the screw 84. Bell crank 86 is pivoted at 88 and controlled by means of the manual adjustment screw 90. This provides means for varying the position of the shoulder 82 and hence the pressure of the lining 77 upon the wear-ring 78.

Figure 5:
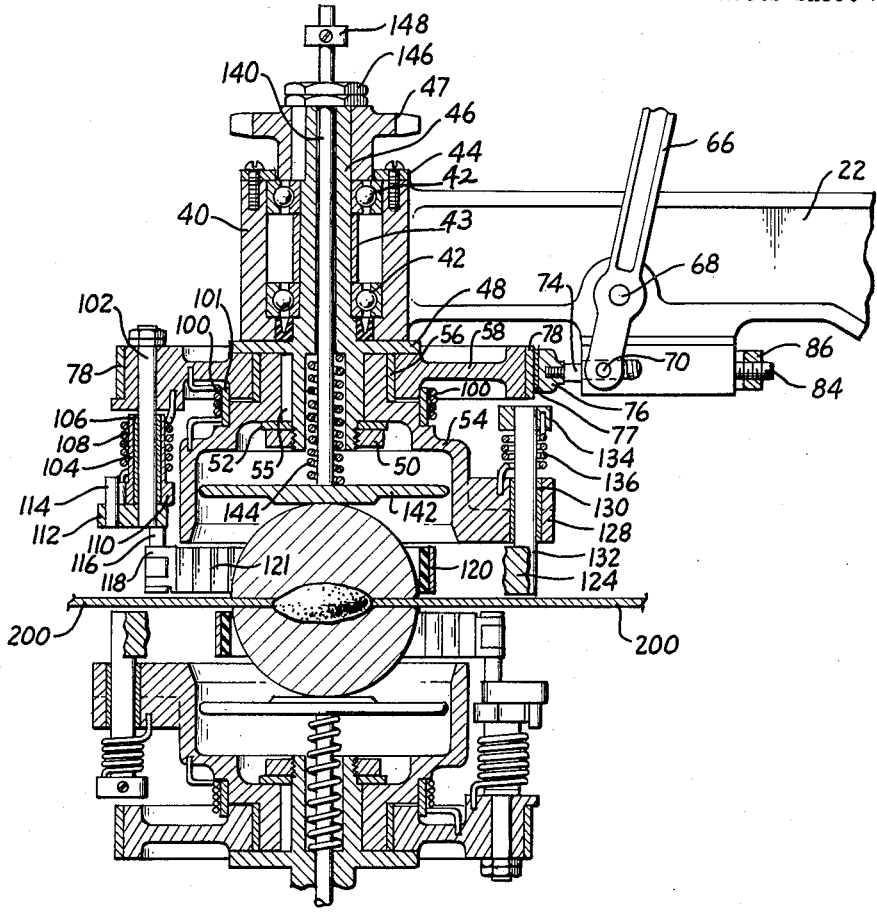
FIGURE 5 is a fragmentary vertical section through the line 5—5 of FIGURE 3.

Brake drum 58 is coaxially mounted and free-wheeling with respect to the cup 54, with the exception of the connection provided by the torsion spring 100 which surrounds bushing 101 in turn mounted about the hub of cup 54. As seen in FIGURE 5, the ends of the torsion spring are received in holes in each of brake drum 58 and the cup 54. As will be explained in greater detail below, the function of the torsion spring 100 is to permit the brake drum 58 to return to a predetermined position with respect to the head 54 at such time as the brake shoe 76 is retracted.

Figure 2:
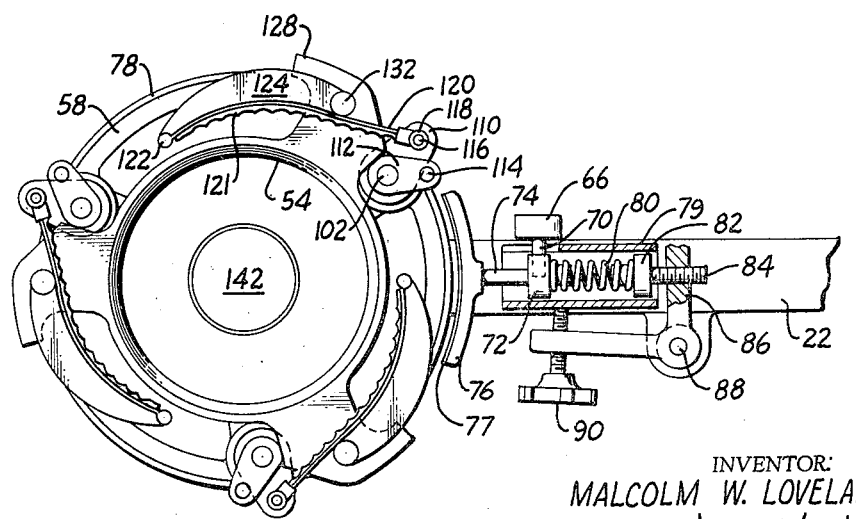
FIGURE 2 is an enlarged, fragmentary section taken on the line 2—2 of FIGURE 1.

Pins 102 are positioned at 120° intervals about the brake drum 58. Mounted about each pin 102 is hollow shaft 104 (FIGURE 5) having internally thereof a wear bushing 106. Concentric and about the hollow shaft 104 is the torsion spring 108 secured at the upper end thereof, as seen in FIGURE 5, to the brake drum 58 and at the lower end thereof to the lever arm 110 which is integral with the hollow shaft 104, whereby normally to urge the arm 110 in a clockwise direction, as seen in FIGURE 2. Fixed to the lower end of each pin 102, as seen in FIGURE 5, is the arm 112 having stop pin 114 mounted therein which serves to terminate clockwise movement of arm 110.

Figure 6:
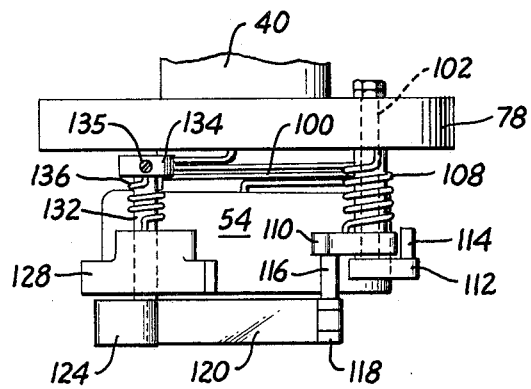
FIGURE 6 is a side elevation of a portion of the apparatus of this invention.

Each lever arm 110 carries an upstanding pin 116 to which is secured yoke 118 which supports one end of the spring steel cinch band 120. Each band has an escalloped rubber facing 121. The opposite end of each band is provided with a yoke, not shown, mounted about a pin 122 carried by the distal end of the banana-shaped arm 124. Each arm 124 is pivoted to a boss 128 which is a part of the casting of the cup element 54. As seen in FIGURE 5, each boss 128 has an internal bushing 130 in which is rotatably mounted pin 132. The pin has a collar 134 held by a set screw 135 (FIGURE 6) and supports the banana-shaped arm 124 at the opposite end thereof. Torsion springs 136 normally urge the banana-shaped arm in a clockwise direction, as seen in FIGURE 2.

The apparatus of this invention is provided with a peach-half ejector similar to that shown in the Harrer et al. patent aforementioned. Slideably mounted in the arm 22 coaxially with the cup 54 is a rod 140 terminating at its inner end in a peach half ejecting disc or pad 142. Surrounding the inner portion of the rod 140 is a compression spring 144 accommodated within a counterbore in the shaft 46. Jam nuts 146 are threaded onto the shaft 46 through which the rod 140 passes and lock sprocket 47 tightly against the race of upper bearing 42. Collar 148 at the outer end of rod 140 limits or gauges the inward movement of the disc 142. As the result of this construction, each disc 142 serves to eject the peach halves from the cups 54 as the cups move to their open or retracted positions.

As in the machine of patent 2,952,286 keyed to the drive shaft 160 is the interrupted gear 162 arranged to mesh with a complementary interrupted pinion 164, the pinion 164 being keyed to the shaft 166 (FIGURE 1). The shaft 166 is journalled in bearings mounted in the frame. Also keyed to the shaft 166 is a helical gear 168 in mesh with a gear 170 journalled to a shaft 172 and in driving engagement with gear 18. As a result of this construction, the gear 18 is periodically driven by the train of gears, including the interrupted gears 162 and 164. Since the gear 18 is in driving relationship with the gear 16 through the intermediate gear 20, the gears 16 and 18 periodically rotate in the same direction in response to the rotation of the drive shaft 160. But since the gears 16 and 18 are keyed, respectively, to the two shafts 14 and 15, the rotation of the gears 16 and 18 results in the rotation of two opposed sprocket wheels 30 and 32 (FIGURE 1).

Figure 3:
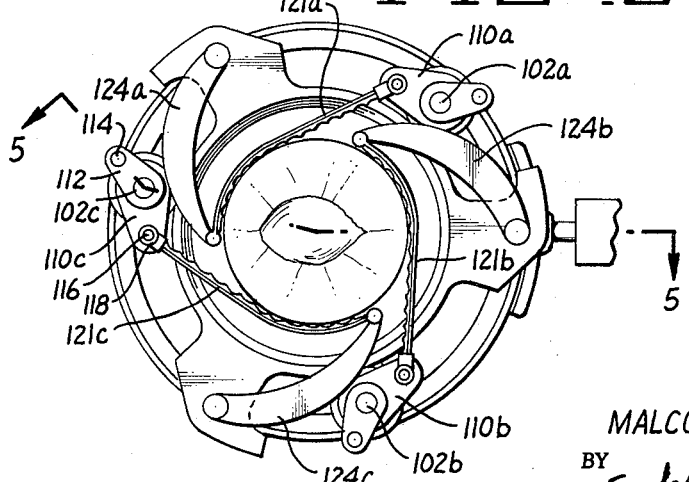
FIGURE 3 is a fragmentary section similar to FIGURE 2 but showing a peach with a normally centered pit gripped by the cinch bands of this invention.
Figure 4:
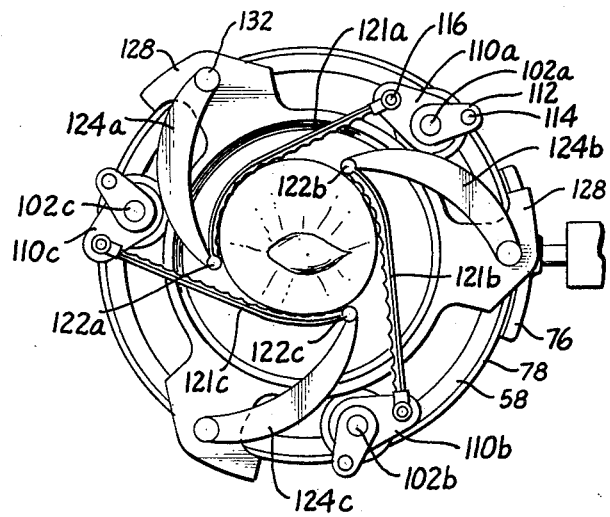
FIGURE 4 is a fragmentary view similar to FIGURES 2 and 3 but showing a peach having an off-center pit gripped by the cinch bands.

In operation, an operator feeds peaches to an arrangement similar to that shown in the aforementioned Harrer et al. patent and each peach is impaled on knives and its pit located between arcuate recesses in the knives 200. As seen in FIGURE 5 the peach is substantially ringed by cups 54, the two peach halves being held together because of their adherence to the pit. Also, at this point in the cycle of operation, the peach cinching bands 120 are in their open or expanded position, as in FIGURE 2, forming a circle sufficiently large to receive a peach of maximum diameter. Immediately after the two cups have fully closed over a peach, they begin to rotate in opposite directions. That is, each sprocket 47 rotates a shaft 46 and a cup 54. As the brake drum is initially held against movement by the action of the brake shoe 76, pin 102 is not advanced counter-clockwise but the bosses 128 supporting the banana-shaped arm 124 are rotated counter-clockwise through the action of cups 54. If the peach is one having a pit which is centered as shown in FIGURE 3, the lever arms 110 will each be rotated counter-clockwise an approximately equal distance against the resistance of torsion springs 108. On the other hand, as seen in FIGURE 4, should the peach have a pit which is located well toward one side, the knives 200 will grip the pit and force the peach flesh toward one side of the cups 54. The first of the cinch bands to contact the peach surface, the band designated 121a in FIGURE 4, is supported from pin 122a. The arm 124a is not permitted to pivot inwardly toward its corresponding pin 102a to as great an extent as arms 124b and 124c because of the resistance of the surface of the peach. Hence the distance between the pin 102a and pin 122a becomes greater than the distance between either pin 102b and pin 122b or between pin 102c and pin 122c. The resilient mounting of lever arm 110a deflects to accommodate the miscentered peach.

It will be noted that each of the other lever arms designated 110b and 110c, respectively, are shown in FIGURE 4 have been pivoted a lesser distance, since the respective banana-shaped arms 124b and 124c have been permitted to pivot greater distances counter-clockwise hence requiring less compensatory pivoting of levers 110b and 110c.

The setting of spring 80 which determines the pressure exerted by the brake lining 77 against the wear-ring 78 of the brake drum 58 is such that after the condition shown in FIGURE 3 or 4 is reached, the brake drum 58 begins to slide with respect to the brake shoe 76 so that continued rotation of the sprocket wheel 47 merely results in the rotation of the entire assembly which is mounted adjacent the bearing housing 40. However, even after rotation of drum 58 has begun, the drag exerted by shoe 76 keeps the bands 120 wrapped about the peach substantially as tightly as when rotation of drum 58 first began. Thus, when the peach breaks free of the pit, further closure of the bands is possible to maintain a firm grip on each peach half.

Also, the setting of the spring 80 must be such that the cinch bands 120 will grip the exterior of the peach sufficiently tightly that the escalloped surfaces 121 will not rotate with respect to the peach surface after contact therewith. That is, the cinch bands must grip the peach exterior sufficiently tightly that the rotational force required to separate the peach flesh from the pit is not great enough to cause the cinch bands to slide over the peach surface, as this would simply mar the surface.

At such time as the entire cup and brake drum assembly has rotated 180°, an arrangement of the type shown in the aforementioned Harrer et al. patent causes the arms 22 and 24 to swing away from one another. Roller 64 rides along the surface of the cam 62 and thereby releases the brake shoe 76. Torsion spring 100 causes the brake drum 58 to return to its original position relative to the cup 54, and the peach ejector or pad 142 returns to its rest position from the position shown in FIGURE 5 and the peach is thus removed from the assembly.

Proper operation of the device is dependent, in part, on providing springs of certain strengths relative to one another. These relationships may be summarized as follows:

Spring 108 has sufficient strength to secure good frictional gripping of the peach.

Spring 134 has sufficient strength to hold lever 124 upwards against the force of gravity when lever 124 is at the topmost position.

Spring 100 is strong enough to return the brake 58 to the position shown in FIGURE 2.

Spring 80 has sufficient strength to develop enough brake force to deflect spring 108 to a large degree. This is adjustable with hand knob 90.

Spring 140 has sufficient strength to eject peach halves rapidly from the head after torquing.

It will be apparent that two or more than three cinch bands could be used, though three is a most convenient number. Also, alternative structures permitting the ends of the cinch bands held by pins 116 to move in the direction of forces exerted from the opposite ends or otherwise permitting an effective differential "lengthening" of individual cinch bands in response to differential forces may be used.

Obviously, many modifications and variations of the invention as hereinbefore set forth may be made without departing from the spirit and scope thereof, and therefore only such limitations should be imposed as are indicated in the appended claims.

I claim:

1. A peach pitting head comprising:
   (a) first and second band-anchoring members arranged for rotation relative to each other on a common axis and substantially in a common plane transverse to said axis;
   (b) means for rotating said first band-anchoring member;
   (c) means for resisting rotation of said second band-anchoring member at the same rate and in the same direction as said first band-anchoring member; and
   (d) means securing at least a pair of flexible peach-gripping bands at one end of each band to the said second band-anchoring member and at the opposite end of each band to the first band-anchoring member, said means for securing said peach-gripping bands to the said first band-anchoring member comprising arms pivoted to the said first band-anchoring member, said peach-gripping bands being secured to the said arms at the distal ends thereof, said means for securing said bands to said second band-anchoring means having resilient means in operative association therewith, said resilient means permitting the ends of the said bands secured to the second anchoring means to yield in the direction of forces applied to the ends of the said bands secured to the arms of the said first band-anchoring member.

2. A peach pitting head comprising:
   (a) first and second band-anchoring members arranged for rotation relative to each other on a common axis and substantially in a common plane transverse to said axis;
   (b) means for rotating and first band-anchoring member intermittently;
   (c) means for resisting rotation of said second band-anchoring member at the same rate and in the same direction as said first band-anchoring member during a portion of the time when said first band-anchoring member is being rotated; and
   (d) means securing at least a pair of flexible peach-gripping bands at one end of each band to the said second band-anchoring member and at the opposite end of each band to the first band-anchoring member, said means for securing said peach-gripping bands to the said first band-anchoring member comprising arms pivoted to the said first band anchoring member, said peach-gripping bands being secured to the said arms at the distal ends thereof, said means for securing said bands to said second band-anchoring means comprising levers pivoted to said second band-anchoring means, said levers being resiliently biased to resist force applied to the ends of the said bands secured to the arms of the said first band-anchoring member.

3. A peach pitting head comprising:
   (a) first and second band-anchoring members arranged for rotation relative to each other on a common axis and substantially in a common plane transverse to said axis;
   (b) means for rotating said first band-anchoring member intermittently;
   (c) means for resisting rotation of said second band-anchoring member at the same rate and in the same direction as said first band-anchoring member during a portion of the time when said first band-anchoring member is being rotated;
   (d) means securing three flexible peach-gripping bands at one end of each band to the said second band-anchoring member and at the opposite end of each band to the first band-anchoring member, said means for securing said peach-gripping bands to the said first band-anchoring member comprising arcuate arms pivoted to the said first band-anchoring member, said peach-gripping bands being secured to the said arms at the distal ends thereof, said means for securing said bands to said second band-anchoring means having resilient means in operative association therewith, said resilient means permitting the ends of the said bands secured to the second anchoring means to yield in the direction of forces applied to the ends of the said bands secured to the arms of the said first band-anchoring member.

4. A peach pitting head comprising:
   (a) first and second band-anchoring members arranged for rotation relative to each other on a common axis and substantially in a common plane transverse to said axis;
   (b) means for rotating said first band-anchoring member intermittently;
   (c) means for resisting rotation of said second band-anchoring member at the same rate and in the same direction as said first band-anchoring member during a portion of the time when said first band-anchoring member is being rotated;
   (d) means securing three flexible peach-gripping bands at one end of each band to the said second band-anchoring member and at the opposite end of each band to the first band-anchoring member, said means for securing said peach-gripping bands to the said first band-anchoring member comprising arcuate arms pivoted to the said first band-anchoring member, said peach-gripping bands being secured to the said arms at the distal ends thereof, said means for securing said bands to said second band-anchoring means having resilient means in operative association therewith normally biasing the ends of the said bands secured to said second band-anchoring means outwardly from the common axis of said band-anchoring members, said resilient means permitting the said last-mentioned band ends to yield in the direction of the common axis of the said band-anchoring members on the application of force tending to pull said bands toward the said common axis.

5. A peach pitting head comprising:
   (a) first and second band-anchoring members arranged for rotation relative to each other on a common axis and substantially in a common plane transverse to said axis;
   (b) means for rotating said first band-anchoring member intermittently;
   (c) means for resisting rotation of said second band-anchoring member at the same rate and in the same direction as said first band-anchoring member during a portion of the time when said first band-anchoring member is being rotated;
   (d) means securing at least a pair of flexible peach-gripping bands at one end of each band to the said second band-anchoring member and at the opposite end of each band to the first band-anchoring member, said means for securing said peach-gripping bands to the said first band-anchoring member comprising arcuate arms pivoted to the said first band-anchoring member, said peach-gripping bands being secured to the said arms at the distal ends thereof, said means for securing said bands to said second band-anchoring means comprising levers pivoted to said second band-anchoring means, said levers being resiliently biased to resist force applied to the ends of the said bands secured to the arms of the said first band-anchoring member; and (e) means for advancing said second band-anchoring member a distance sufficient to assume a predetermined position relative to the said first band-anchoring member when said rotation resisting means of paragraph (c) is inoperative.

6. A peach pitting head comprising:
(a) first and second band-anchoring members arranged for rotation relative to each other on a common axis and substantially in a common plane transverse to said axis;
(b) means for rotating said first band-anchoring member intermittently;
(c) means for resisting rotation of said second band-anchoring member at the same rate and in the same direction as said first band-anchoring member during a portion of the time when said first band-anchoring member is being rotated; and
(d) means securing three flexible peach-gripping bands at one end of each band to the said second band-anchoring member and at the opposite end of each band to the first band-anchoring member, said means for securing said peach-gripping bands to the said first band-anchoring member comprising arcuate arms pivoted to the said first band-anchoring member, said peach-gripping bands being secured to the said arms at the distal ends thereof, said means for securing said bands to said second band-anchoring means comprising levers pivoted to said second band-anchoring means, said levers being resiliently biased to resist force applied to the ends of the said bands secured to the arms of the said first band-anchoring member.

7. A peach pitting head comprising:
(a) first and second band-anchoring members arranged for rotation relative to each other on a common axis and substantially in a common plane transverse to said axis;
(b) means for rotating said first band-anchoring member intermittently;
(c) means for resisting rotation of said second band-anchoring member at the same rate and in the same direction as said first band-anchoring member during a portion of the time when said first band-anchoring member is being rotated;
(d) means securing three flexible peach-gripping bands at one end of each band to the said second band-anchoring member and at the opposite end of each band to the first band-anchoring member, said means for securing said peach-gripping bands to the said first band-anchoring member comprising arcuate arms pivoted to the said first band-anchoring member, said peach-gripping bands being secured to the said arms at the distal ends thereof, said means for securing said bands to said second band-anchoring means comprising levers pivoted to said second band-anchoring means, said levers being resiliently biased to resist force applied to the ends of the said bands secured to the arms of the said first band-anchoring member; and
(e) an escalloped elastomeric facing secured to each of said bands.

8. A peach pitting head comprising:
(a) first and second band-anchoring members arranged for rotation relative to each other on a common axis and substantially in a common plane transverse to said axis;
(b) means for rotating said first band-anchoring member;
(c) means for resisting rotation of said second band-anchoring member at the same rate and in the same direction as said first band-anchoring member during a portion of the time;
(d) means securing at least a pair of flexible peach-gripping bands at one end of each band to the said second band-anchoring member and at the opposite end of each band to the first band-anchoring member, said means for securing said peach-gripping bands to the said first band-anchoring member comprising arms pivoted to the said first band-anchoring member, said peach-gripping bands being secured to the said arms at the distal ends thereof, said means for securing said bands to said second band-anchoring means having resilient means in operative association therewith, said resilient means permitting the ends of the said bands secured to the second anchoring means to yield in the direction of forces applied to the ends of the said bands secured to the arms of the said first band-anchoring member;
(e) a second assembly according to sub-paragraphs (a)-(d) arranged to face the assembly of paragraphs (a)-(d) with the peach-gripping bands of each assembly adjacent one another, said second assembly being arranged for rotation in the opposite direction as the said first assembly, each of said assemblies being provided with means for pivoting the said assemblies away from one another whereby to expose the said peach-gripping bands thereof.

9. A peach pitting head comprising:
(a) first and second band-anchoring members arranged for rotation relative to each other on a common axis and substantially in a common plane transverse to said axis;
(b) means for rotating said first band-anchoring member intermittently;
(c) means for resisting rotation of said second band-anchoring member at the same rate and in the same direction as said first band-anchoring member, said means comprising a brake shoe in frictional engagement with said second band-anchoring member, said brake shoe being resiliently urged against the said second band-anchoring member whereby to permit rotation thereof on the application of a predetermined rotation force to the said second band-anchoring member; and
(d) means securing at least a pair of flexible peach-gripping bands at one end of each band to the said second band-anchoring member and at the opposite end of each band to the first band-anchoring member, said means for securing said peach-gripping bands to the said first band-anchoring member comprising arms pivoted to the said first band-anchoring member, said peach-gripping bands being secured to the said arms at the distal ends thereof, said means for securing said bands to said second band-anchoring means having resilient means in operative association therewith, said resilient means permitting the ends of the said bands secured to the second anchoring means to yield in the direction of forces applied to the ends of the said bands secured to the arms of the said first band-anchoring member.

References Cited in the file of this patent
UNITED STATES PATENTS

| | | |
|---|---|---|
| 2,952,286 | Harrer et al. | Sept. 13, 1960 |
| 3,003,529 | Creed | Oct. 10, 1961 |